(12) United States Patent
Misciagna

(10) Patent No.: US 10,513,173 B1
(45) Date of Patent: Dec. 24, 2019

(54) ADVANCED BALLISTIC TOLERANT FUEL CONTAINMENT TANK

(71) Applicant: The Boeing Company, Chicago, IL (US)

(72) Inventor: David T. Misciagna, West Chester, PA (US)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 15/478,722

(22) Filed: Apr. 4, 2017

Related U.S. Application Data

(63) Continuation of application No. 14/248,518, filed on Apr. 9, 2014, now abandoned.

(51) Int. Cl.
*B60K 15/03* (2006.01)

(52) U.S. Cl.
CPC .......... B60K 15/03177 (2013.01); *B60K 2015/03046* (2013.01); *B60K 2015/03407* (2013.01); *B60K 2015/03493* (2013.01)

(58) Field of Classification Search
CPC .......... B60K 2015/03407; B60K 2015/03046; B60K 2015/03493; B60K 15/03177
See application file for complete search history.

(56) References Cited

U.S. PATENT DOCUMENTS

| | | | |
|---|---|---|---|
| 1,263,049 A | 4/1918 | Evans | |
| 1,386,791 A | 8/1921 | Murdock | |
| 2,401,627 A | 6/1946 | Eger | |
| 3,664,904 A | 5/1972 | Cook | |
| 4,584,041 A | 4/1986 | Lyman | |
| 4,925,057 A | 5/1990 | Childress et al. | |
| 6,121,383 A * | 9/2000 | Abdou-Sabet | C08L 23/10 525/192 |
| 7,861,884 B2 | 1/2011 | Childress et al. | |
| 7,900,333 B2 | 3/2011 | Tweet et al. | |
| 8,505,761 B2 | 8/2013 | Tweet et al. | |
| 8,777,158 B2 | 7/2014 | Erickson | |
| 2013/0193139 A1 | 8/2013 | Karsch | |

* cited by examiner

*Primary Examiner* — Stephen J Castellano
(74) *Attorney, Agent, or Firm* — Joseph M. Rolnicki; Evans & Dixon, L.L.C.

(57) ABSTRACT

A fuel tank of an advanced ballistic tolerant fuel containment system is constructed with an inner layer designed to contain fuel, an intermediate layer or layers designed to self-seal any openings or holes made into the fuel tank, and an exterior layer that reinforces the fuel tank and provides the fuel tank with hard points for connection to an aircraft or vehicle. The interior layer, the intermediate layer and the exterior layer are all constructed of thermoplastic materials.

17 Claims, 6 Drawing Sheets

ADVANCED BALLISTIC TOLERANT FUEL CONTAINMENT TANK

This patent application is a continuation of patent application Ser. No. 14/248,518, which was filed on Apr. 9, 2014, now abandoned.

FIELD

This disclosure pertains to an advanced ballistic tolerant fuel containment system and its method of construction. The system involves a fuel tank primarily designed for an aircraft or other type of vehicle that can be exposed to ballistic projectiles in use. The fuel tank is constructed with an inner layer designed to contain fuel, an intermediate layer or layers designed to self-seal any openings or holes made into the tank, and an exterior layer that reinforces the fuel tank and provides the fuel tank with hard points for connection to the aircraft or vehicle. The interior layer, the intermediate layer and the exterior layer are all constructed of thermoplastic materials.

BACKGROUND

The constructions for fuel cells and/or fuel tanks for aircraft and other vehicles that can be exposed to ballistic projectiles in use has basically remained the same for many years. The fuel tank constructions and the materials have not changed in over 50 years because the existing technology is easily qualified through similarity, and because a robust full cell industrial base existed for producing the fuel tanks. However, over the last decade the industrial base has begun to shrink. It has also become more difficult to fabricate fuel tanks employing the accustomed materials and methods of construction due to environmental regulations that have made many of the materials used to fabricate the fuel tanks obsolete.

The conventional construction of crash-worthy and ballistic tolerant fuel tanks has relied on a non-permeable fuel cell membrane to contain the fuel, a self-sealing element to seal the fuel tank should a ballistic projectile produce an opening or hole in the tank, and outer reinforcement plies.

The outer reinforcement plies are typically nylon reinforced vulcanized nitrile-rubber. These reinforcement plies are designed with sufficient strength to overcome the forces generated from a 65 foot fluid filled drop test of the tank and a ballistic hydrodynamic event. Overcoming these forces makes this type of construction of the fuel tank inherently heavy.

The self-sealing element of the conventional fuel tank is typically provided by natural gum rubber. Crash-worthy and ballistic tolerant fuel tanks are provided with a self-sealing element based on the chemical reaction that occurs when the natural gum rubber employed in fabricating the tank is exposed to the hydrocarbons in fuel released from the tank due to an opening or hole produced by a ballistic projectile. This interdependency between the self-sealing material of the fuel tank and the fuel type held by the fuel tank that initiates the self-sealing functioning is a constraint on the operation and design of current ballistic tolerant and self-sealing fuel systems.

SUMMARY

The self-sealing fuel tank of the present disclosure is basically comprised of an inner liner layer, an outer reinforcement layer, and a middle self-sealing layer situated substantially between the inner layer and the outer layer. A plurality of hard points are secured to the fuel tank exterior layer for use in securing the fuel tank in an aircraft or other vehicle. The construction of the fuel tank is unique in its use of thermoplastics.

The fuel tank has a hollow interior volume that is dimensioned to hold and store a pre-determined amount of fuel. The tank inner layer is constructed of an interior layer of material that surrounds the hollow interior volume. The interior layer of material is a thermoplastic material.

The middle self-sealing layer is constructed of an intermediate layer of material that surrounds the interior layer of material. The intermediate layer of material is a thermoplastic elastomer material. The thermoplastic elastomer material swells when contacted by fuel held by the fuel tank that would pass through an opening or hole made in the tank. The swelling of the thermoplastic elastomer material on contact with the fuel functions to self-seal the opening made through the intermediate layer of material.

The outer reinforcement layer is constructed of an exterior layer of material that surrounds the intermediate layer of material. The exterior layer of material is a thermoplastic elastomer material.

The plurality of hard points are constructed as flanges of thermoplastic material. The plurality of hard point flanges are secured to the interior layer of material, the intermediate layer of material and the exterior layer of material by resistive heating, ultrasonic welding, induction or radio frequency welding or by another equivalent method.

The construction of the ballistic tolerant fuel tank reduces acquisition and fabrication costs over that of conventional ballistic tolerant fuel tanks by 20%. This is achieved by using the thermoplastic materials and thermoplastic material forming processes. The fuel tank has improved ballistic projectile self-sealing properties and the thermoplastic materials provide the fuel tank with alternative fuel capability. Additionally, the use of the thermoplastic materials reduces the weight of the fuel tank by 30% over that of conventional ballistic tolerant fuel tanks. Still further, the domestic supplier of materials is increased by addressing the materials obsolescence of conventional ballistic tolerant fuel tanks and eliminating manufacturing techniques with deleterious environment impacts.

DETAILED DESCRIPTION

Figure 1:
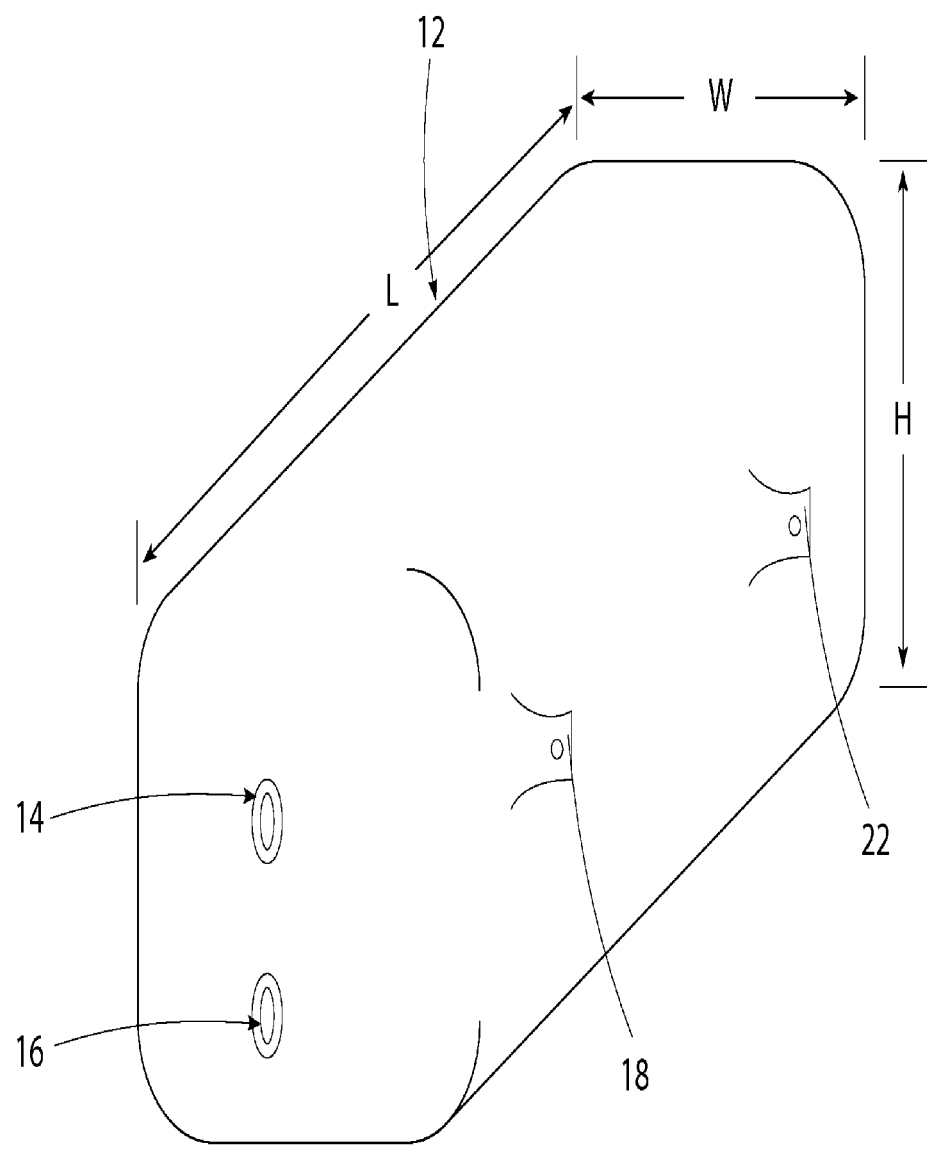
FIG. 1 is a representation of a perspective view of the advanced ballistic tolerant fuel containment tank.

FIG. 1 is a representation of a perspective view of the advanced ballistic tolerant fuel containment tank 12 of this disclosure. The embodiment of the tank 12 shown in FIG. 1 has a longitudinal length dimension L, a lateral width dimension W, and a vertical height dimension H. The configuration of the tank 12 represented in FIG. 1 is only one example of how the tank can be configured. The tank can have any shape and can be dimensioned differently to best suit it to fit into an area in a vehicle allotted for the tank. The tank 12 is constructed with access openings from the exterior of the tank to the interior of the tank. In FIG. 1 two such axis openings 14, 16 are represented. The access openings 14, 16 are provided in the tank 12 for conventional purposes such as providing an opening for a connection to a fuel outlet conduit, providing an opening for a connection to a fuel level sensor assembly, or for any other device that is conventionally connected with a fuel tank for monitoring the fuel in the fuel tank or for other typical purposes. The view of the tank 12 in FIG. 1 also shows a pair of hard point flanges 18, 22 connected to the tank along one side of the tank. The hard point flanges 18, 22 are provided on the tank 12 for securing the tank to the structure of an aircraft or other vehicle in which the take is used. The hard point flanges 18, 22 are constructed of vulcanized rubber and are secured to the tank 12 by IR/ultrasonic/heat/radio-frequency/etc. Only two hard point flanges 18, 22 are shown to provide a general representation of the hard point flanges in the construction of the tank. It should be understood that the number of hard point flanges and their positions on the tank will be dictated by the particular aircraft or vehicle in which the tank is used.

Figure 2:
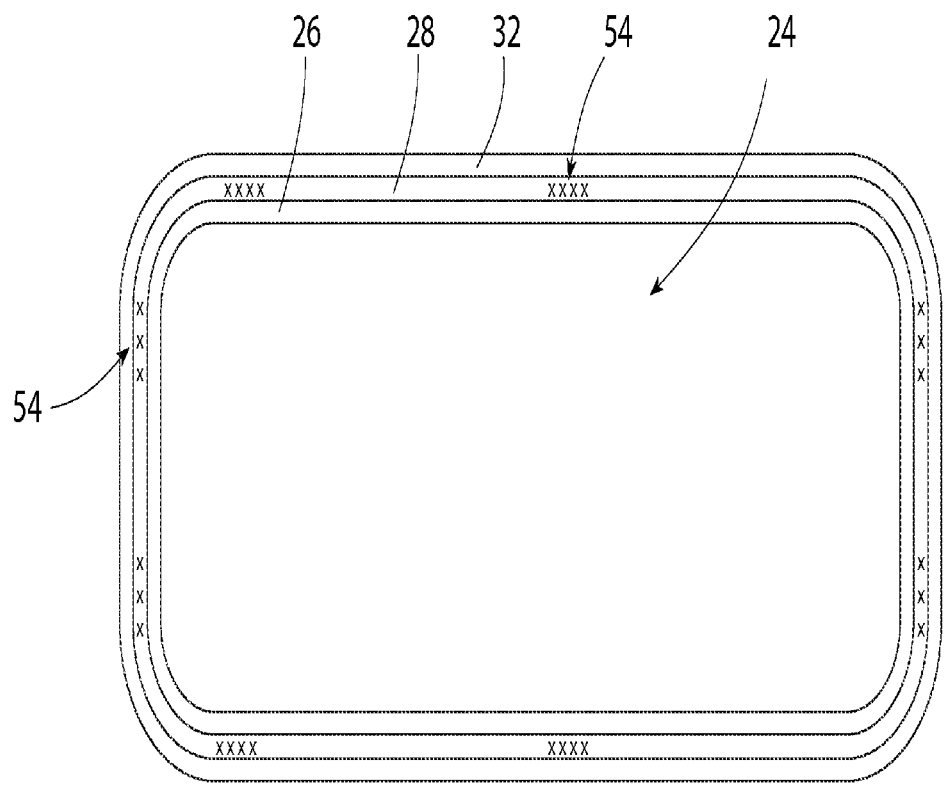
FIG. 2 is a representation of a cross-section view along the length of the tank.
Figure 3:
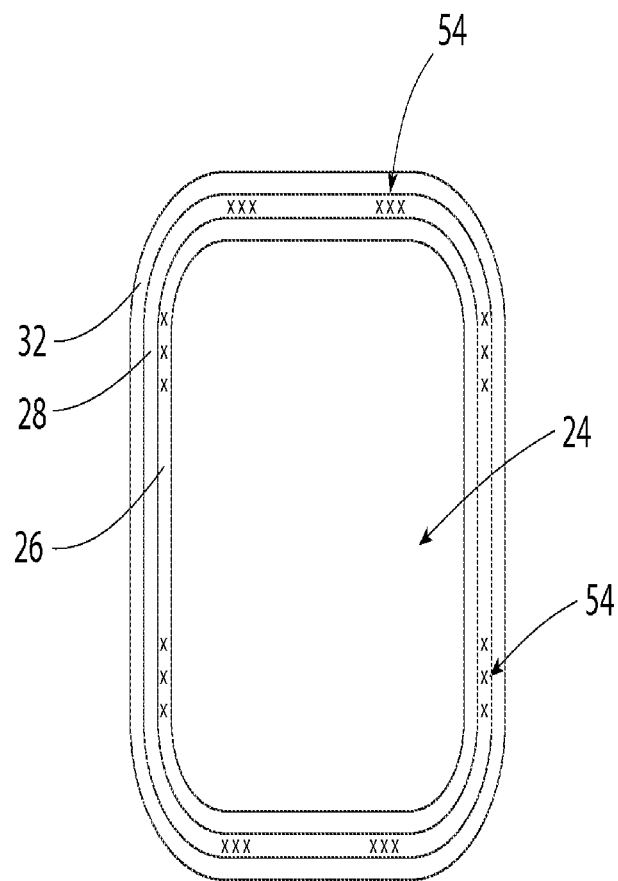
FIG. 3 is a representation of a cross-section view across the width of the tank.

FIG. 2 is a representation of a cross-section of the tank 12 along the tank length. FIG. 3 is a representation of a cross-section of the tank across the tank width. The representation of the tank 12 shown in FIGS. 2 and 3 has a hollow interior volume 24 that is surrounded by the construction of the tank. An interior layer 26 of material completely surrounds the hollow interior volume 24 of the tank. An intermediate layer 28 of material completely surrounds the interior layer 26. An exterior layer 32 of material completely surrounds the intermediate layer 28. The tank hollow interior volume 24 is dimensioned to hold and store a predetermined amount of fuel that is basically dictated by the particular aircraft or vehicle in which the tank is used.

The interior layer 26 is constructed of a material that will not react with conventional fuels used in the engines of the aircraft or other vehicles. In an embodiment of the tank 12 the interior layer 26 is constructed of a thermoplastic material. In one embodiment the interior layer material is polytetrafluoroethylene (PTFE). The thermoplastic material of the interior layer 26 could also be expanded polytetrafluoroethylene (ePTFE). These materials have unique stress vs. strain properties during high strain rate events. The materials are also impervious to fuels. The material of the interior layer 26 could be injection molded to provide the interior layer with the desired configuration for the fuel tank of a particular aircraft or vehicle. The material could also be sprayed and baked into shape prior to welding of the interior layer 26 to the rest of the bladder. The material could also be filmed and joined to create the three-dimensional shape of the bladder and then welded into the bladder with the other materials. The key attribute of the interior layer 26 is fuel permeability. No fuel can be allowed to get through. The interior layer also needs high elongation so that it can strain with the bladder during a 65' drop test.

The material of the intermediate layer 28 is a thermoplastic elastomer material such as a thermoplastic vulcanizate (TPV). The intermediate layer 28 is not actually an independent layer, but is a matrix that holds together the PTFE/ePTFE. This material 26 has a lower processing temperature than the material used as a reinforcement, e.g., PTFE. This enables joining of the materials because the fiber reinforcement will not melt, but the matrix will. These thermoplastics have rubber like attributes. The particular thermoplastic elastomer material of the intermediate layer 28 expands when contacted by conventional fuel held in the tank interior volume 24. For example, a material like a styrene thermoplastic elastomer could be used as a matrix in some of the inner layers instead of a fuel resistant material like the thermoplastic vulcanite. This matrix would be used in conjunction with a thermoplastic fiber in the other matrix in a system with the fuel resistant matrix on the outside layer of the tank and the fuel swelling on the inside layer. Fuel that would leak through an opening or hole made in the tank will cause the material of the intermediate layer to expand in the hole. The expansion of the thermoplastic elastomer material on contact with the fuel functions to self-seal the hole made through the intermediate layer 28. Thus, the thermoplastic elastomer material of the intermediate layer 28 functions as a primary self-sealing feature of the tank 12.

Figure 4:
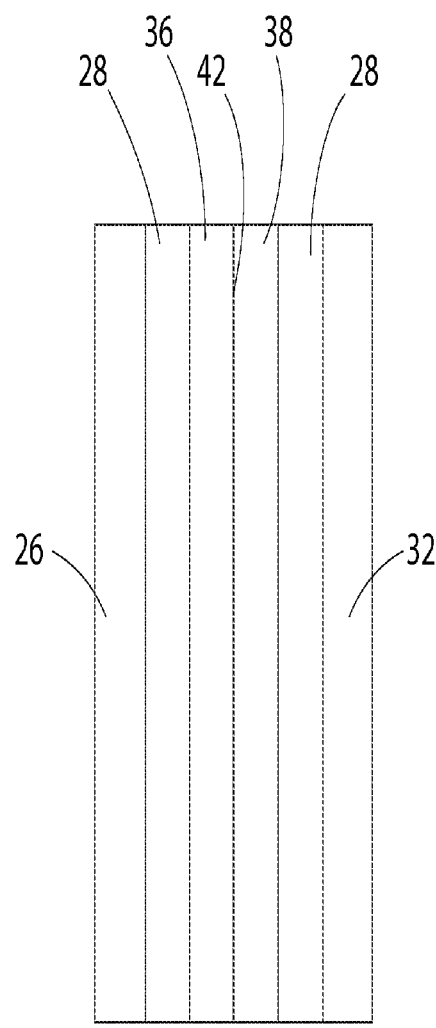
FIG. 4 is a representation of a partial cross-section view showing details of the tank.

The intermediate layer 28 is provided with a secondary self-sealing feature. In other embodiments of the tank 12 the secondary self-sealing feature could be a stand alone sealing feature of the intermediate layer 28. One embodiment of the secondary self-sealing feature is represented in FIG. 4 which shows a partial cross-section of a tank 12. The secondary self-sealing feature employs expanding polyurethane foam to self-seal openings or holes made in the tank 12. Referring to FIG. 4, thin films of first 36 and second 38 reactive materials are provided in the intermediate layer 28. In one example one of the first 36 and second 38 reactive materials is an isocyanate and the other of the first 36 and second 38 reactive materials is a polyol. These two reactive materials, when mixed together create an expanding polyurethane foam that expands and cures rapidly. The two reactive materials 36, 38 are encapsulated between two thin thermoplastic film layers and are separated and embedded in the intermediate layer 28 by a thin fuel dissolvable membrane 42 that extends through the intermediate layer 28. An example of the dissolvable membrane could be polystyrene which dissolves instantly in fuel. Should the tank 12 be punctured by a projectile, the hole made in the tank intermediate layer 28 would also produce a hole through the membrane 42. The hole in the membrane 42 would allow the first reactive material 36 and the second reactive material 38 to mix through the hole, producing the expanding polyurethane foam. The foam expands and cures quickly, thereby self-sealing the hole closed.

Although only one membrane 42 separating the two reactive materials 36, 38 is represented in FIG. 4, a plurality of membranes 42 could be employed in the tank intermediate layer 28 with each membrane separating two films of the reactive materials 36, 38.

Figure 5:
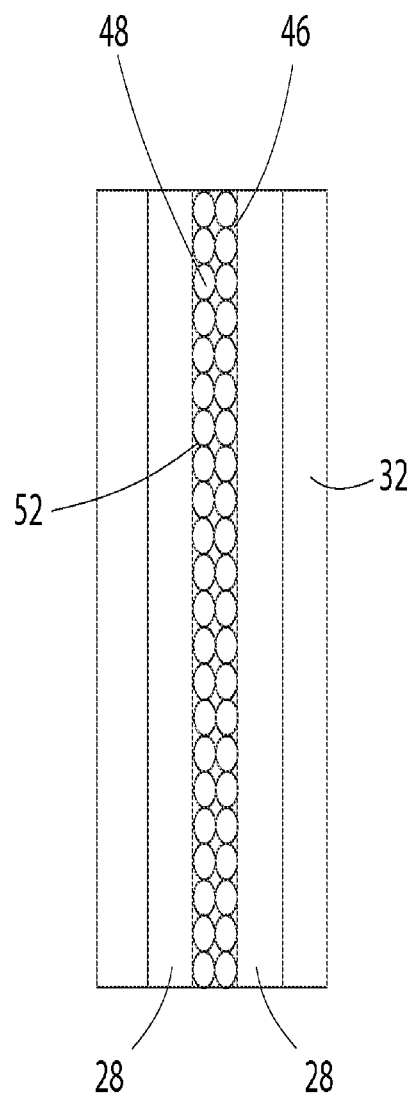
FIG. 5 is a representation of a partial cross-section view showing details of the tank.

A further embodiment of the secondary self-sealing feature of the tank 12 is represented in FIG. 5. In FIG. 5 the tank intermediate layer 28 includes a first reactive material 46 and a second reactive material 48 within the layer, where the second reactive material 48 is contained in capsules 52, for example polystyrene capsules that are suspended in a matrix of the first reactive material 46. In the example of the expanding polyurethane discussed earlier, either the isocyanate or polyol is contained in the capsules 52 and the capsules are suspended in a matrix of the other of the isocyanate and polyol. When a ballistic projectile produces a hole in the tank 12 the projectile will pass through the intermediate layer 28 damaging some of the capsules 52 and exposing a number of the capsules 52 to the fuel contained in the tank interior volume 24. The fuel will then dissolve the capsules 52 allowing the two reactive materials 46, 48 to mix. The mixed reactive materials produce the expanding polyurethane foam that expands and quickly cures in the hole sealing the hole closed. The speed of the reaction self-seals the hole and reduces seepage and the likelihood of fire from an incendiary threat.

To reinforce the thermoplastic elastomer material of the intermediate layer 28, the intermediate layer could also be provided with reinforcing fibers 54 represented schematically in FIGS. 2 and 3. The thermoplastic material is used as a thermoplastic matrix combined with thermoplastic fibers such as PTFE or hydroxybenzoic acid and napthoic acid (HBA/HNA liquid crystalline polymers). This combination of materials replaces the vulcanized rubber, adhesives and hazardous chemicals like toluene and methyl ethyl ketone (MEK) currently used to fabricate fuel cells. In one embodiment the reinforcing fibers 54 could be knitted, three-dimensional thermoplastic fibers in the intermediate layer 28 of material. The knitting is a key element in this embodiment of the fuel bladder. The knitting material and the fabrication of the knitting allows for computer controlled knitting of the reinforcement layers. These layers can be knitted in 1-ply and will not have seams, like a woven or braided material form. The computer controlled knitting process can also incorporate the openings for the flange areas in the pre-form that is created. Also, the openings that are created have a looped end enabling a thermoplastic ring to be incorporated around the perimeter. This allows for unique connections to the flanges other than just fusing the materials with heat, etc. The key attributes here are the flange interfaces and a restraint layer that will be stronger because there are no overlaps or seams to weaken it. The knit is also a looser weave that will allow the bladder to elongate more which may provide added strain and energy absorption. The knitted, three-dimensional thermoplastic fibers 54 completely surround the interior layer of material 26. The reinforcing fibers 54 are impregnated with the thermoplastic elastomer material of the intermediate layer 28. In a further embodiment the reinforcing fibers 54 could be in the form of a woven fabric. The fabric could be a biaxial weave or triaxial weave of the fibers 54. Again, the fabric completely surrounds the interior layer 26 and is impregnated with the thermoplastic elastomer material of the intermediate layer 28.

In both of the embodiments of the reinforcing fibers 54 in the intermediate layer of material 28, the intermediate layer 28 and the reinforcing fibers 54 could be prepared as a pre-preg prior to fabrication of the tank. Alternatively, the thermoplastic fibers of the intermediate layer 28 could be interweaved between layers of the thermoplastic elastomer material.

The exterior layer 32 of the tank completely surrounds the intermediate layer 28. In the discussed embodiments the material of the exterior layer 32 is a thermoplastic elastomer material.

As stated earlier, there are a number of hard point flanges 18 secured to the tank 12. The hard point flanges 18 are secured to each of the interior layer 26, the intermediate layer 28 and the exterior layer 32 of the tank.

Figure 6:
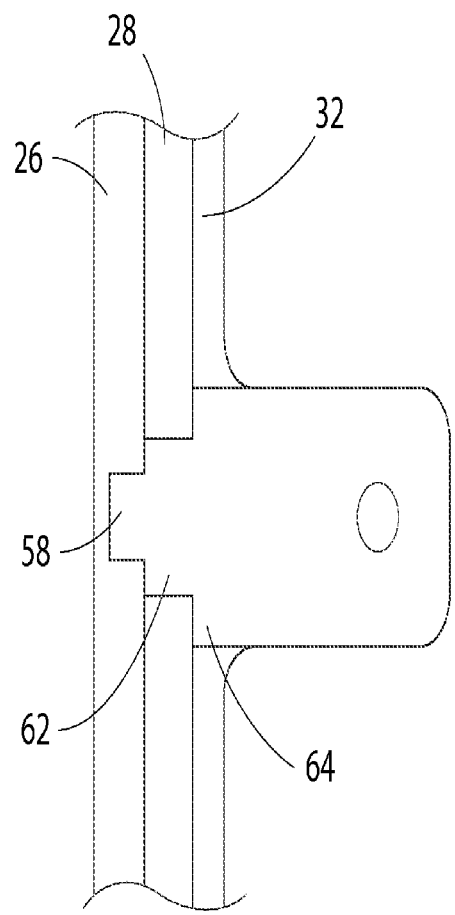
FIG. 6 is a representation of a partial cross-section view showing a hard point connected to the tank.

FIG. 6 shows a representation of the connection of one hard point flange 18 to the tank 12. The hard point flange 18 is constructed as a fiber reinforced thermoplastic material. One example of the fiber reinforcement is graphite fibers. The flanges could also be fiber reinforced polyetherketoneketone (PEKK) or polyetheretherketone (PEEK), replacing the current metallic flanges at reduced cost and weight. The flange 18 is constructed with a tapered or stepped end to match the tank layer construction.

In FIG. 6 the flange 18 is constructed with a first step 58 that is joined to the tank interior layer 26. The flange first step 58 can be joined to the thermoplastic material of the interior layer 26 by resistive heating, ultrasonic welding, induction or radio frequency welding or by any other equivalent method.

The second step 62 of the hard point flange 18 is joined to the tank intermediate layer 28. As with the first step 58, the second step 62 can be joined to the tank intermediate layer 28 by resistive heating, ultrasonic welding, induction or radio frequency welding or by any other equivalent method.

The third step 64 of the hard point flange 18 is joined to the tank exterior layer 32. Again, the third step 64 can be joined to the tank exterior layer 32 by resistive heating, ultrasonic welding, induction or radio frequency welding or by any other equivalent method.

The construction of the ballistic tolerant fuel tank described above reduces acquisition and fabrication costs over that of conventional ballistic tolerant fuel tanks by 20%. This is achieved by using the thermoplastic materials and thermoplastic material forming processes. The fuel tank has improved ballistic projectile self-sealing properties and the thermoplastic materials provide the fuel tank with alternative fuel capability. Additionally, the use of the thermoplastic materials reduces the weight of the fuel tank by 30% over that of conventional ballistic tolerant fuel tanks. Still further, the domestic supplier of materials is increased by addressing the materials obsolescence of conventional ballistic tolerant fuel tanks and eliminating manufacturing techniques with deleterious environment impacts.

As various modifications could be made in the construction of the apparatus and its method of construction herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A fuel tank comprising:
a hollow interior volume that is dimensioned to hold and store a predetermined amount of fuel;
an interior layer of material surrounding the hollow interior volume, the interior layer of material being a thermoplastic material;
an intermediate layer of material surrounding the interior layer of material, the intermediate layer of material being a thermoplastic elastomer material that swells when contacted by fuel that would pass through an opening made through the intermediate layer of material and the interior layer of material, thereby self-sealing the opening through the intermediate layer of material; the intermediate layer of material also comprising first and second reactive materials in the intermediate layer of material, the first and second reactive materials expanding and curing rapidly when mixed, the first and second reactive materials being, separated in the intermediate layer of material by a membrane where an opening made through the intermediate layer of material would make an opening in the membrane that would allow the first and second reactive materials to mix through the opening and expand and rapidly cure in the opening and thereby form a seal closing the opening; the intermediate layer of material also comprising a reinforcement layer of thermoplastic fibers knitted in a three-dimensional configuration in the intermediate layer of material, the reinforcement layer of thermoplastic fibers knitted in the three-dimensional configuration surrounding the interior layer of material with no overlaps or seams to weaken the reinforcement layer and being impregnated with the thermoplastic elastomer of the intermediate layer of material.

2. The fuel tank of claim 1, further comprising:
the intermediate layer of material being a thermoplastic vulcanizate.

3. The fuel tank of claim 1, further comprising:
an exterior layer of material being a thermoplastic material.

4. The fuel tank of claim 1, further comprising:
the thermoplastic fibers knitted in the three-dimensional configuration being impregnated with thermoplastic elastomer material as a pre-preg, preform prior to fabrication of the tank.

5. The fuel tank of claim 1, further comprising:
the thermoplastic fibers knitted in the three-dimensional configuration having been knitted in one ply and having no seams.

6. The fuel tank of claim 1, further comprising:
the first and second reactive materials being separated in the intermediate layer of material by the membrane formed as a thin sheet between the first and second reactive materials.

7. The fuel tank of claim 1, further comprising:
the first and second reactive materials being separated in the intermediate layer of material by the membrane formed as a plurality of capsules, the plurality of capsules containing the first of the first and second reactive materials and the plurality of capsules being suspended in a matrix of the second of the first and second reactive materials.

8. The fuel tank of claim 1, further comprising:
a plurality of hard point flanges of thermoplastic, the plurality of hard point flanges being secured to the interior layer of material and secured to the intermediate layer of material.

9. A fuel tank comprising:
a hollow interior volume that is dimensioned to hold and store a predetermined amount of fuel;
an interior layer of material surrounding the hollow interior volume, the interior layer of material being a thermoplastic material;
an intermediate layer of material surrounding the interior layer of material, the intermediate layer of material being a thermoplastic elastomer material that swells when contacted with a fuel in the interior volume that would leak through a hole made through the intermediate layer of material and the interior layer of material, thereby self-sealing the hole through the intermediate layer of material and the interior layer of material, the intermediate layer of material also comprising first and second reactive materials in the intermediate layer of material, the first and second reactive materials expanding and curing rapidly when mixed, the first and second reactive materials being separated in the intermediate layer of material by a membrane where an opening made through the intermediate layer of material would make an opening in the membrane that would allow the first and second reactive materials to mix through the opening and expand and rapidly cure in the opening and thereby form a seal closing the opening; the intermediate layer of material also comprising a reinforcement layer of thermoplastic fibers knitted in a three-dimensional configuration in the intermediate layer of material, the reinforcement layer of thermoplastic fibers knitted in the three-dimensional configuration surrounding the interior layer of material with no overlaps or seams to weaken the reinforcement layer and being impregnated with the thermoplastic elastomer of the intermediate layer of material;
an exterior layer of material surrounding the intermediate layer of material, the exterior layer of material being a thermoplastic material; and,
a plurality of hard point flanges of thermoplastic material, the plurality of hard point flanges being secured to the interior layer of material, the intermediate layer of material and the exterior layer of material.

10. The fuel tank of claim 9, further comprising:
the intermediate layer of material being a thermoplastic vulcanizate.

11. The fuel tank of claim 9, further comprising:
the thermoplastic fibers knitted in the three-dimensional configuration being impregnated with thermoplastic elastomer material as a pre-preg, preform prior to fabrication of the tank.

12. The fuel tank of claim 9, further comprising:
the thermoplastic fibers knitted in the three-dimensional configuration having been knitted in one ply and having no seams.

13. The fuel tank of claim 9, further comprising:
the first and second reactive materials being separated in the intermediate layer of material by the membrane formed as a thin sheet between the first and second reactive materials.

14. The fuel tank of claim 9, further comprising:
the first and second reactive materials being separated in the intermediate layer of material by the membrane formed as a plurality of capsules, the plurality of capsules containing the first of the first and second reactive materials and the plurality of capsules being suspended in a matrix of the second of the first and second reactive materials.

15. A method of making a ballistic tolerant fuel containment tank comprising:
forming an interior layer of a thermoplastic material around a hollow interior volume that is dimensioned to store a predetermined amount of fuel;
forming an intermediate layer of a thermoplastic elastomer material around the interior layer, the thermoplastic elastomer material expanding when contacted by a fuel that would leak from the interior volume through a hole through the intermediate layer of thermoplastic elastomer material and the interior layer, thereby self-sealing the hole;
providing first and second reactive materials in the intermediate layer where the first and second reactive materials will expand and cure rapidly when mixed;
separating the first and second reactive materials in the intermediate layer with a membrane where an opening made through the intermediate layer would make an opening in the membrane that would allow the first and second reactive materials to mix through the opening and expand and cure rapidly in the opening and thereby from a seal closing the opening;
reinforcing the intermediate layer with thermoplastic fibers knitted in a three-dimensional configuration in the intermediate layer of material, the thermoplastic fibers knitted in the three-dimensional configuration surrounding the interior layer of material with no overlaps or seams in the thermoplastic fibers knitted in the three-dimensional configuration, and the thermoplastic fibers knitted in the three-dimensional configuration being impregnated with the thermoplastic elastomer material of the intermediate layer;

forming an exterior layer of thermoplastic material around the intermediate layer; and, securing a plurality of hard point flanges of thermoplastic material to the interior layer, the intermediate layer and the exterior layer.

16. The method of claim 15, further comprising:

impregnating the thermoplastic fibers knitted in the three-dimensional configuration with thermoplastic elastomer materials as a pre-preg, preform prior to fabrication of the tank.

17. The method of claim 15, further comprising:

knitting the thermoplastic fibers knitted in the three-dimensional configuration in one ply with no seams.

\* \* \* \* \*